United States Patent
Sultana et al.

(10) Patent No.: US 12,116,897 B2
(45) Date of Patent: Oct. 15, 2024

(54) TURBINE STATOR ASSEMBLY WITH A RADIAL DEGREE OF FREEDOM BETWEEN A GUIDE VANE ASSEMBLY AND A SEALING RING

(71) Applicant: SAFRAN AIRCRAFT ENGINES, Paris (FR)

(72) Inventors: Patrick Jean Laurent Sultana, Moissy-Cramayel (FR); Marc-Antoine Anatole Got, Moissy-Cramayel (FR); Laurent Cédric Zamai, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/256,339

(22) PCT Filed: Dec. 3, 2021

(86) PCT No.: PCT/FR2021/052203
§ 371 (c)(1),
(2) Date: Jun. 7, 2023

(87) PCT Pub. No.: WO2022/123157
PCT Pub. Date: Jun. 16, 2022

(65) Prior Publication Data
US 2024/0102397 A1    Mar. 28, 2024

(30) Foreign Application Priority Data
Dec. 9, 2020 (FR) ..................... 2012891

(51) Int. Cl.
*F01D 11/00* (2006.01)
*F01D 9/04* (2006.01)

(52) U.S. Cl.
CPC ............ *F01D 11/001* (2013.01); *F01D 9/041* (2013.01); *F01D 11/005* (2013.01); *F05D 2240/56* (2013.01)

(58) Field of Classification Search
CPC ............................... F01D 11/001; F01D 9/041
See application file for complete search history.

(56) References Cited

U.S. PATENT DOCUMENTS 2,915,280 A * 12/1959 Sonder ................. F01D 11/001
 415/138
4,524,980 A *  6/1985 Lillibridge ............ F01D 11/008
 416/193 A (Continued)

FOREIGN PATENT DOCUMENTS

EP    2 594 743 A1    5/2013
EP    3 690 192 A1    8/2020

(Continued)

OTHER PUBLICATIONS

International Search Report mailed on Mar. 15, 2022 in PCT/FR2021/052203 filed on Dec. 3, 2021 (2 pages).

*Primary Examiner* — Brian O Peters
(74) *Attorney, Agent, or Firm* — Oblon, McClelland, Maier & Neustadt, L.L.P.

(57) ABSTRACT

A turbine stator assembly including a guide vane assembly and a sealing ring bearing an abradable element of a dynamic sealing ring. The assembly includes pins secured to the sealing ring and cooperating with respective oblong openings formed in the guide vane assembly so as to allow a radial movement of the ring with respect to the guide vane assembly in order to compensate for differential thermal expansions. A seal is arranged so as to compensate for circumferential spaces between ring sectors forming the guide vane assembly.

11 Claims, 5 Drawing Sheets

(56) References Cited

U.S. PATENT DOCUMENTS

| | | | |
|---|---|---|---|
| 6,695,314 B1 | 2/2004 | Gail et al. | |
| 2012/0195741 A1* | 8/2012 | Sarawate | F16J 15/441 277/355 |
| 2014/0105725 A1* | 4/2014 | Stiehler | F01D 11/02 72/352 |
| 2022/0195891 A1* | 6/2022 | Reverseau | F01D 9/042 |

FOREIGN PATENT DOCUMENTS

| | | |
|---|---|---|
| FR | 3 027 343 A1 | 4/2016 |
| FR | 3 085 708 A1 | 3/2020 |
| WO | WO 2020/233947 A1 | 11/2020 |

* cited by examiner

TURBINE STATOR ASSEMBLY WITH A RADIAL DEGREE OF FREEDOM BETWEEN A GUIDE VANE ASSEMBLY AND A SEALING RING

TECHNICAL FIELD

The invention relates to the field of combustion gas turbines for turbine engines of aircraft propulsion units.

In particular, the invention may be implemented within a low-pressure turbine of a turbojet engine.

PRIOR ART

A conventional turbojet engine turbine comprises one or more axial stage(s) disposed in series which allow converting combustion energy into motive energy, in particular in order to drive a compressor(s) rotor and a fan shaft.

To do so, each stage of the turbine comprises a guide vane assembly forming a stator and a movable wheel forming a rotor. The guide vane assembly comprises fixed vanes configured to accelerate and divert a combustion gas flow in the direction of movable vanes carried by a disc of the movable wheel.

It is known to arrange a dynamic seal radially inside the guide vane assembly in order to reduce the circulation of gases out of the primary annular duct in which the fixed and movable vanes extend. Such a seal comprises an abradable element secured to the guide vane assembly and one or more wiper(s) secured to the rotor.

During the operation of the turbojet engine, the guide vane assembly is exposed to higher temperatures than the disc of the movable wheel and the thermal inertia of the guide vane assembly is generally lower than that of the disc, which results in a variation of the gap between the abradable element and wipers.

This results in an increase in the leakage flow rate when the aforementioned gap increases and an acceleration of the wear of the abradable element when this gap decreases.

The document FR 3 027 343 A1 discloses a mounting solution enabling a radial movement between the abradable element and the guide vane assembly, but sealing of such a mounting is not satisfactory.

DISCLOSURE OF THE INVENTION

The invention aims to improve sealing within a turbine of a turbine engine, in particular within a low-pressure turbine.

To this end, an object of the invention is a turbine stator assembly extending around an axis and comprising:
- a sealing ring extending around the axis and comprising an abradable element intended to cooperate with sealing wipers carried by a rotor rotatably mounted around the axis,
- a plurality of crown sectors disposed circumferentially end-to-end around the axis so as to together form a crown, each crown sector being bladed,
- sliding means enabling a relative movement radially with respect to the axis between the sealing ring and each of the crown sectors, the sliding means being disposed at a radially inner end of the crown formed by the plurality of crown sectors.

According to the invention, this assembly comprises sealing means located radially outward from the sliding means so as to reduce leaks originating from circumferential spaces located between the circumferentially adjacent crown sectors.

Thus, the invention allows radially decoupling the crown sectors and the support ring from each other while ensuring satisfactory sealing.

The radial decoupling of the sealing ring and of the guide vane assembly formed by the crown sectors allows reducing and possibly suppressing the variation in the radial gap between the abradable element and the wiper(s) which cooperate with this abradable element, that being so in all of the operating phases of the turbine engine, in particular in the transient mode.

In one embodiment, the sealing means comprise a brush seal bearing axially on the one hand on the crown sectors and on the other hand on the sealing ring or on a part secured to the sealing ring.

Such a seal allows effectively compensating for misalignments of the crown sectors with respect to each other and covering the circumferential spaces between adjacent crown sectors.

Such a seal also allows reducing the leaks likely to occur throughout the radial gaps between the sealing ring and the crown sectors.

This results in an improve in sealing which allows in particular increasing the accuracy of the possibly desired leakage flow rate, for example via calibrated holes or passages formed in the ring.

In one embodiment, each of the crown sectors comprises, over a circumferential end face, one or more groove(s), the sealing means comprising sealing plates each of which accommodated both in one of the grooves of one of the crown sectors and another one of the grooves of another circumferentially adjacent crown sector so as to extend through the circumferential space located between these two circumferentially adjacent crown sectors.

Such sealing plates allow further improving sealing within the turbine.

In one embodiment, the sliding means comprise pins carried by one amongst the sealing ring and the plurality of crown sectors, the other one amongst the sealing ring and the plurality of crown sectors comprising oblong openings each crossed by a respective one of the pins.

Preferably, the oblong openings are formed by the crown sectors so as to open radially inwards these crown sectors.

Such an opening of the oblong openings enables mounting of the crown sectors, after assembly of the pins with the sealing ring, by moving the crown sectors radially inwards relative to the sealing ring so as to fit the pins into the corresponding oblong openings.

This results in a simpler assembly.

In one embodiment, the sealing ring comprises an upstream flange and a downstream flange and each of the crown sectors comprises a flange extending axially between the upstream flange and the downstream flange of the sealing ring.

Such an arrangement of flanges improves the axial positioning of the crown sectors with respect to the sealing ring and the maintenance of the alignment of these crown sectors with respect to each other.

This also allows ensuring the guidance of the sealing ring when the latter, for example under the effect of its expansion, moves radially relative to the crown sectors.

Preferably, the flange of each of the crown sectors is connected to the upstream and downstream flanges of the sealing ring via at least one of said pins.

In one embodiment, the flange of each of the crown sectors comprises one or more of said oblong openings.

In one embodiment, each of the upstream flange and the downstream flange of the sealing ring comprises at least one orifice receiving respectively an upstream portion and a downstream portion of a respective one amongst said pins, each pin comprising an intermediate portion extending through a respective one amongst the oblong openings, each of the upstream portion and the downstream portion of each pin having a diameter larger than the diameter of its intermediate portion.

In particular, such a geometry of the pins allows avoiding loss thereof in the event of accidental separation.

Preferably, the pins are mounted by shrink-fitting in the ring. To this end, the diameter of the orifices of the upstream and downstream flanges of the sealing ring and the diameter of the upstream and downstream portions of the pins, respectively, are selected so as to form a tight fit.

The mounting of the pins by shrink-fitting allows both holding them in position and contributing to sealing of the assembly.

The invention also relates to a turbine comprising a casing and a stator assembly as defined hereinabove carried by the casing, in particular a low-pressure turbine.

In one embodiment, the turbine comprises a rotor provided with sealing wipers configured to cooperate with the abradable element of the stator assembly.

The invention also covers a turbine engine comprising such a turbine and/or such a stator assembly, as well as an aircraft propulsion unit comprising such a turbine engine.

According to another aspect, the invention relates to a method for assembling a stator assembly as defined hereinabove.

Other advantages and features of the invention will appear upon reading the detailed, non-limiting description that follows.

BRIEF DESCRIPTION OF THE DRAWINGS

The following detailed description refers to the appended drawings wherein.

DETAILED DESCRIPTION OF SOME EMBODIMENTS

The figures include a reference frame L, R and C respectively defining axial (or longitudinal), radial and circumferential directions orthogonal to each other.

Figure 1:
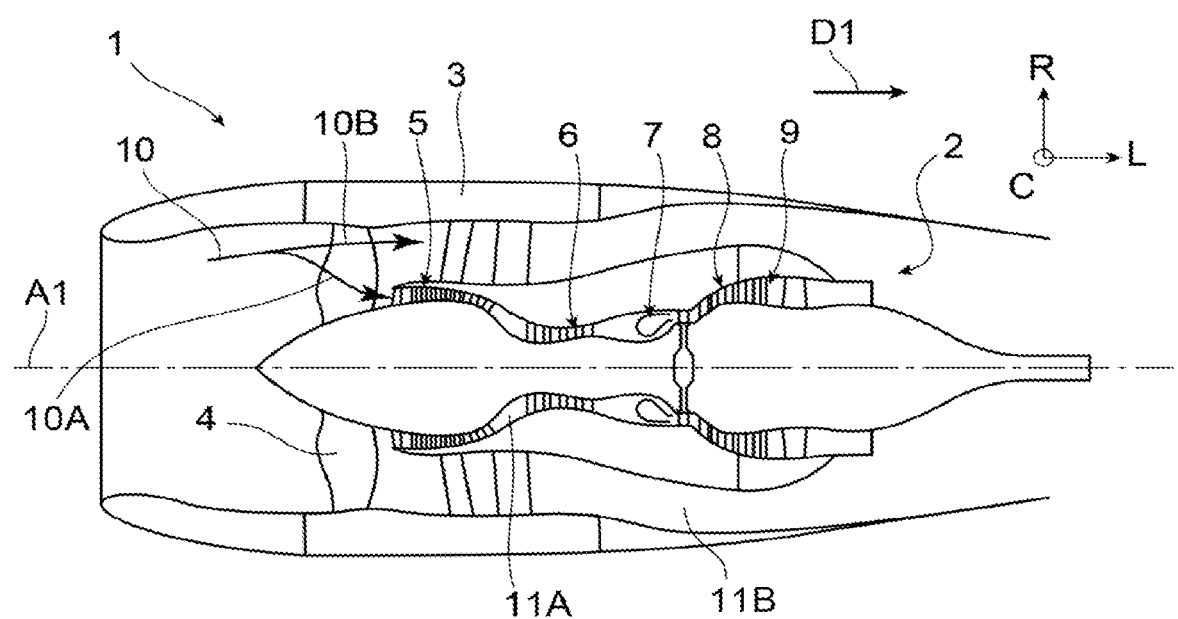
FIG. 1 is a schematic axial sectional view of an aircraft propulsion unit.

FIG. 1 shows an aircraft propulsion unit 1 comprising a turbine engine 2 faired by a nacelle 3. In this example, the turbine engine 2 is a twin-spool turbofan engine.

The terms "upstream" and "downstream" will hereafter be defined with respect to a direction D1 of gas flow through the propulsion unit 1 when it is propelled.

The turbofan engine 2 has a longitudinal central axis A1 about which the various components thereof extend, in this case, from upstream to downstream, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

During operation of the turbofan engine 2, an air flow 10 enters the propulsion unit 1 through the air inlet upstream of the nacelle 3, passes through the fan 4 and then splits into a central primary flow 10A and a secondary flow 10B. The primary flow 10A flows in a main gas flow path 11A passing through the gas generator. In turn, the secondary flow 10B flows in a secondary flow path 11B surrounding the gas generator and delimited radially outwards by the nacelle 3.

Figure 2:
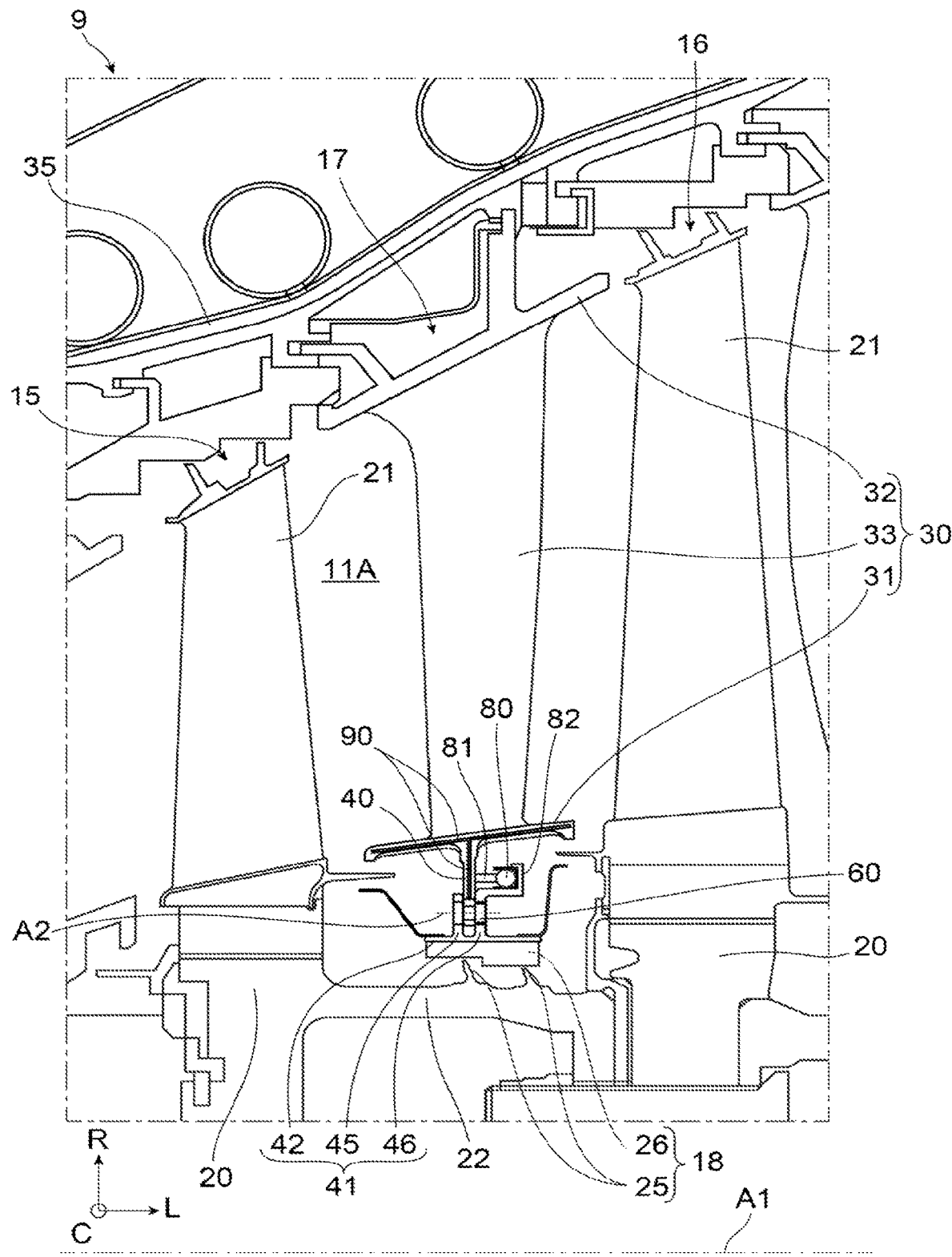
FIG. 2 is a partial schematic axial sectional half-view of a low-pressure turbine of a turbine engine.

The low-pressure turbine 9, partially represented in FIG. 2, is configured to recover a portion of the combustion energy in order to drive movable wheels forming the rotor of the turbine 9 in rotation around the axis A1. Between each pair of adjacent movable wheels, the turbine 9 comprises a bladed stator crown forming a guide vane assembly.

FIG. 2 shows a portion of two movable wheels 15 and 16, of a guide vane assembly 17 and of a dynamic seal 18 of the turbine 9.

The guide vane assembly 17 extends axially between the movable wheel 15, which forms an upstream wheel, and the movable wheel 16, which forms a downstream wheel.

In a manner known per se, each of the movable wheels 15 and 16 comprises a disc 20 and blades 21 carried by the disc 20.

In this example, the disc 20 of the upstream wheel 15 comprises a shroud 22 extending axially in the direction of the downstream wheel 16, radially inside the guide vane assembly 17. A downstream end of the shroud 22 is connected to the disc 20 of the downstream wheel 16 so as to secure the wheels 15 and 16 together in rotation around the axis A1.

The dynamic seal 18 is formed on the one hand by annular wipers 25 carried by the shroud 22 and, on the other hand, by an abradable element 26, or wearing part, connected to the guide vane assembly 17.

During the operation of the turbojet engine 2, the movable wheels 15 and 16 are driven in rotation around the axis A1, which causes a friction of the wipers 25 on the abradable element 26. Thus, the seal 18 allows for a dynamic sealing which reduces the circulation of gas out of the main flow path 11A, in this case radially between the guide vane assembly 17 and the shroud 22.

More specifically, the invention relates to the connection of the abradable element 26 with the guide vane assembly 17.

In this example, the guide vane assembly 17 comprises several sectors 30 disposed circumferentially end-to-end so as to form together a bladed crown.

Figure 3:
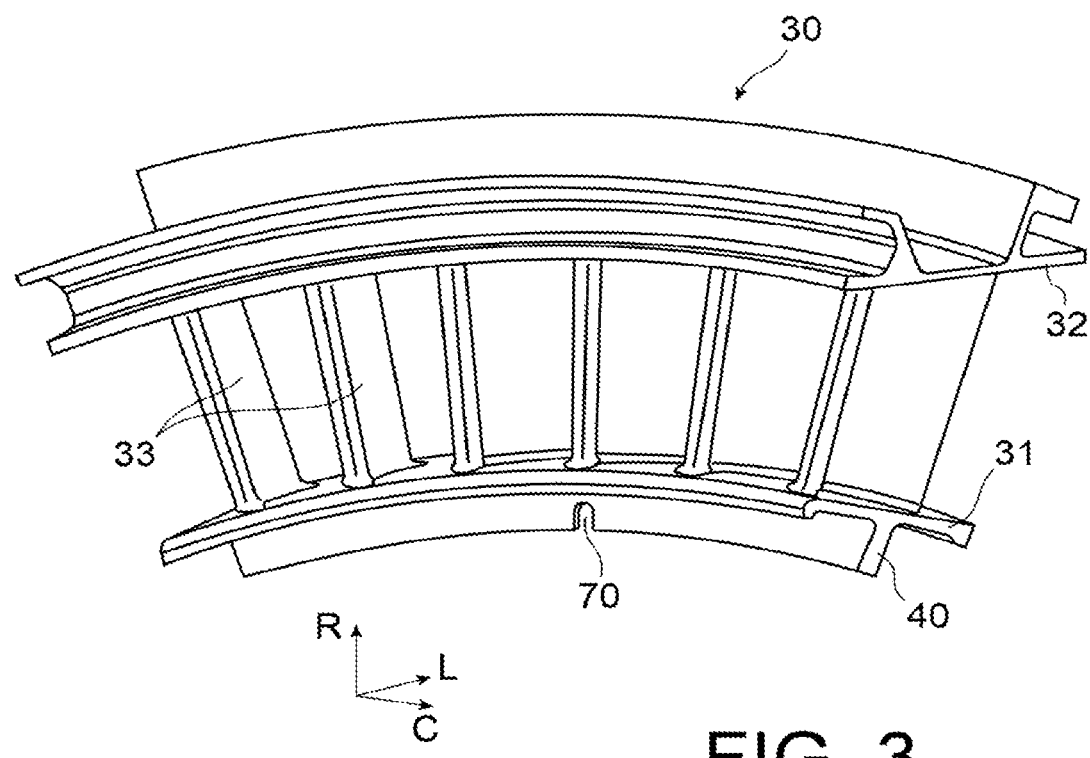
FIG. 3 is a schematic perspective view of a sector of a guide vane assembly of the turbine of FIG. 2.

FIG. 3 shows one of these crown sectors 30.

In this example, all of the crown sectors 30 of the guide vane assembly 17 are identical so that the following description, which relates to the crown sector 30 of FIG. 3, applies to each of the other crown sectors.

Referring to FIGS. 2 and 3, the crown sector 30 comprises an inner platform 31, an outer platform 32 and blades 33.

Each of the blades 33 is connected on the one hand to the inner platform 31 and on the other hand to the outer platform 32 so as to extend radially through the main flow path 11A, which is radially delimited by these platforms 31 and 32.

The blades 33 of the crown sector 30 are circumferentially spaced apart from each other.

The outer platform 32 is configured to be fastened on a casing 35 of the turbojet engine 2.

In this example, the crown sector 30 comprises a flange 40 connected to the inner platform 31 so as to extend radially inwards from the inner platform 31, in the direction of the shroud 22.

The flange 40 is configured to cooperate with a sealing ring 41.

Figure 4:
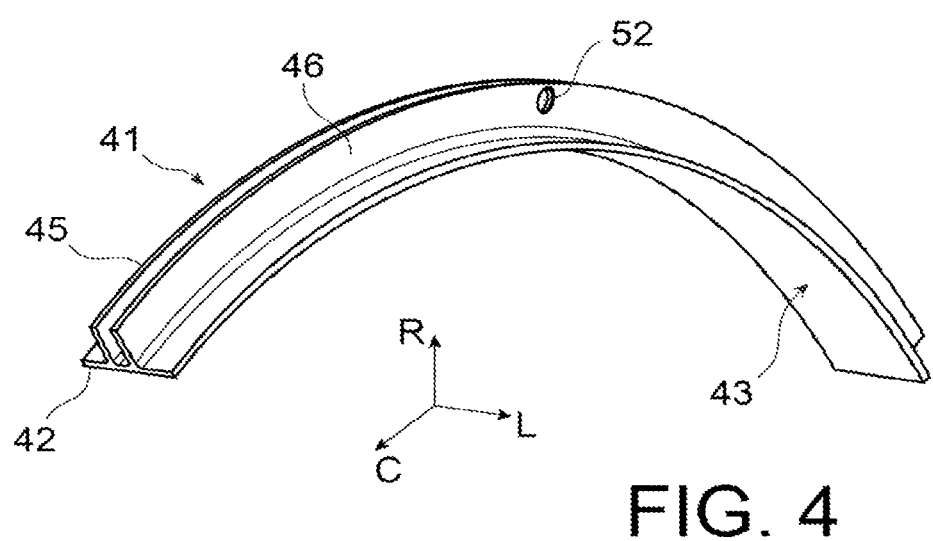
FIG. 4 is a schematic perspective view of a section of a ring forming a support for an abradable element of a dynamic seal of the turbine of FIG. 2.

FIG. 4 shows a circumferential section of the ring 41, it being understood that the latter forms an annular crown.

In this example, the ring 41 is a part carrying the abradable element 26, which also forms an annular crown.

Figure 5:
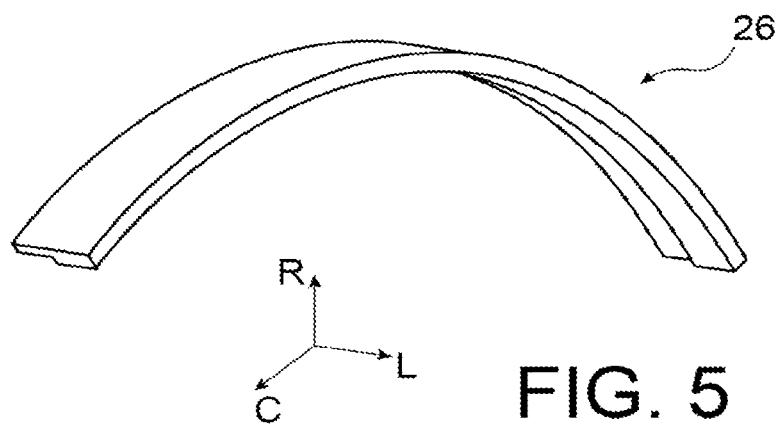
FIG. 5 is a schematic perspective view of a section of an annular abradable element of said dynamic seal of the turbine of FIG. 2.

Referring to FIGS. 4 and 5, which respectively show a circumferential section of the ring 41 and a corresponding circumferential section of the abradable element 26, the ring 41 comprises to this end a platform 42 defining an inner surface 43 over which the abradable element 26 is fastened according to the configuration of FIG. 2.

Moreover, the ring 41 comprises an upstream flange 45 and a downstream flange 46 extending radially outwards from the platform 42.

Referring to FIGS. 2, 4, 6 and 8, the flanges 45 and 46 are axially spaced apart from each other so as to form a U-shaped section defining a space in which the flange 40 of the crown sectors 30 could be inserted.

The axial distance between the flanges 45 and 46 is selected so as to enable adequate axial positioning and maintenance in the axial position of the crown sector 30, while enabling mobility thereof by radial sliding of the flange 40 between the flanges 45 and 46 (cf. hereinbelow).

Figure 6:
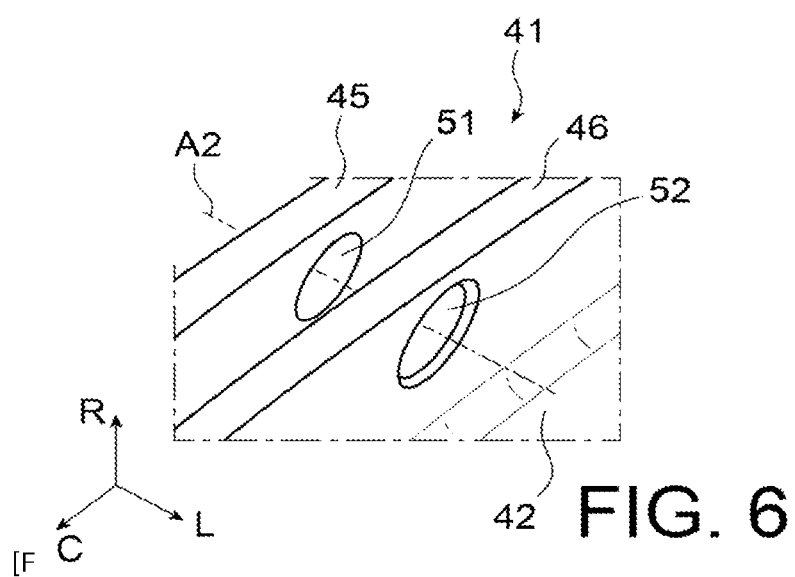
FIG. 6 is a schematic perspective view of a portion of the ring of FIG. 4, showing orifices for receiving a pin.

FIG. 6 shows two orifices 51 and 52 formed respectively in the upstream flange 45 and the downstream flange 46 of the ring 41.

Figure 7:
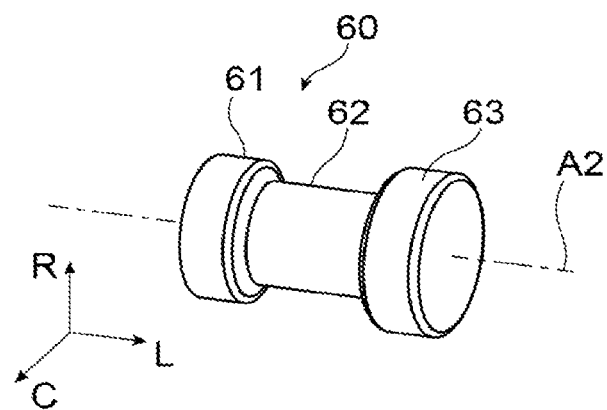
FIG. 7 is a schematic perspective view of a pin intended to ensure a cooperation of the crown sector of FIG. 3 with the ring of FIG. 4.

The orifices 51 and 52 have a common axis A2 and are intended to receive a pin 60 such as that one represented in FIG. 7.

In this embodiment, the pin 60 is a cylindrical part with an axis A2 having two shoulders which define an upstream portion 61, an intermediate portion 62 and a downstream portion 63.

The intermediate portion 62 has a diameter smaller than the diameter of the upstream portion 61 and of the downstream portion 63.

The diameter of the upstream portion 61 is further smaller than that of the downstream portion 63.

The orifice 51 of the upstream flange 45 of the ring 41 is sized so as to receive the upstream portion 61 of the pin 60 so as to form a tight fit.

Similarly, the orifice 52 of the downstream flange 46 of the ring 41 is sized so to receive the downstream portion 63 of the pin 60 so as to form a tight fit.

After assembly, the pin 60 is thus carried by the ring 41, forming a complete connection with the latter.

The pin 60 is configured to cooperate with the guide vane assembly 17, in particular with the flange 40 of the crown sector 30.

Figure 8:
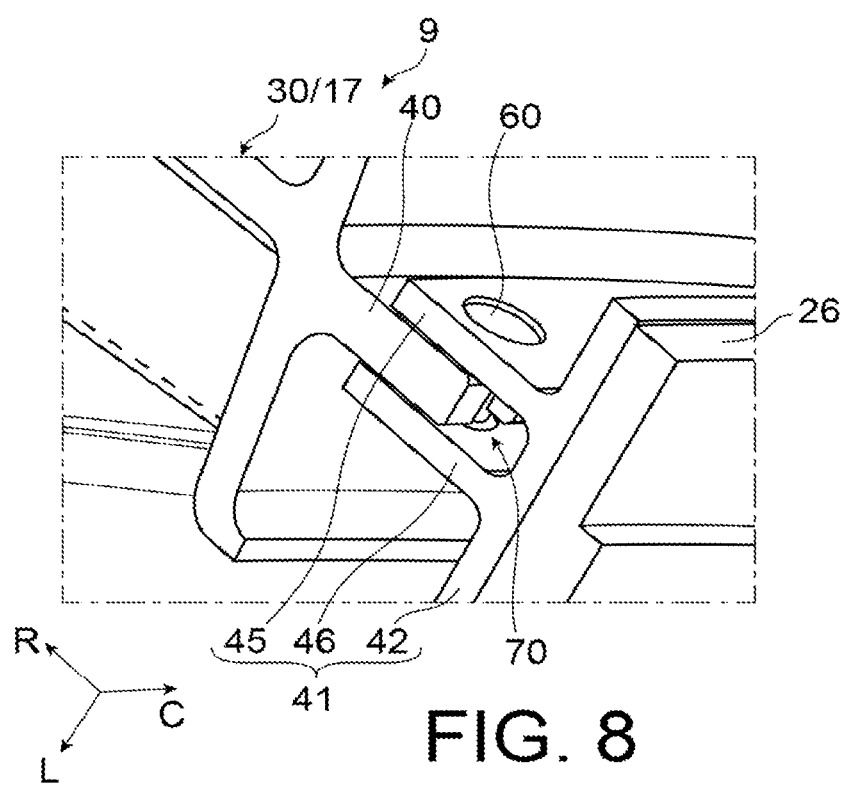
FIG. 8 is a schematic perspective view of a portion of the turbine of FIG. 2.

Referring to FIGS. 3 and 8, the flange 40 comprises to this end an opening 70 which has an oblong shape of the groove type extending radially.

In this example, the opening 70 leads radially inwards the crown sector 30.

The opening 70 has a width, or circumferential dimension, enabling it to be crossed by the intermediate portion 62 of the pin 60, i.e. a width larger than the diameter of the intermediate portion 62 of the pin 60.

Moreover, the width of the opening 70 is smaller than the diameter of the upstream portion 61 and of the downstream portion 63 of the pin 60. Thus, in the event of a break up of the connection between the pin 60 and the ring 41, the flange 40 of the crown sector 30 forms an axial stop for retaining the pin 60.

In contrast with the rotor of the turbine 9 whose portions are movable in rotation around the axis A1, the assembly formed by the ring 41, the abradable element 26, the crown sector 30 and the pin 60 belong to the stator of the turbine 9.

The assembly of this stator element comprises a pre-insertion of the pin 60 into the ring 41 by making the upstream portion 61 of the pin 60 pass through the orifice 52 of the downstream flange 46.

Afterwards, the pin 60 is fastened to the ring 41 by forced insertion of its upstream portion 61 into the orifice 51 of the upstream flange 45 and, simultaneously, of its downstream portion 63 into the orifice 52 of the downstream flange 46.

Afterwards, the crown sector 30 is moved radially inwards so as to fit the flange 40 axially between the flanges 45 and 46 of the ring 41 and to insert the intermediate portion 62 of the pin 60 into the opening 70 of the flange 40.

These assembly steps allow reaching to the configuration illustrated in FIGS. 2 and 8.

In this configuration, the pin 60 forms on the one hand a circumferential stop for the crown sector 30, preventing a movement of the ring 41 and of the crown sector 30 relative to each other in rotation around the axis A1 and allowing centring ring 41 with respect to this axis A1.

On the other hand, given the respective dimensions of the intermediate portion 62 of the pin 60 and of the oblong opening 70, the assembly enables a radial movement of the ring 41 relative to the crown sector 30.

Thus, the pin 60 and the oblong opening 70 form sliding means.

The stator assembly may comprise other pins similar to the pin 60 each cooperating with the flange 40 of a respective one amongst the other crown sectors 30 according to the above-described principles.

Of course, these principles may be generalised. For example, each of the crown sectors 30 of the guide vane assembly 17 may cooperate with several pins similar to the pin 60.

In general, the invention allows connecting the sealing ring 41 and the guide vane assembly 17 to one another according to a connection defining a radial degree of freedom able to compensate for the differential thermal expansions within the turbine 9.

Thus, the radial clearance between wipers 25 and the abradable element 26 may be kept substantially constant during the operation of the turbojet engine 2, which improves sealing conferred by the dynamic seal 18.

The forced mounting of the pins 60 into the orifices 51 and 52 of the ring 41 contributes to the reduction of gas leaks outside the main flow path 11A.

The seal 80 further improves sealing of the turbine 9.

In the embodiment of FIG. 2, the seal 80 is an annular brush seal 81 interposed between the ring 41 and the crown sectors 30.

More specifically, the sealing ring 41 of FIG. 2 comprises a secondary flange 82 secured to the downstream flange 46 and extending radially between the pin 60 and the platform 31 of the crown sector 30.

The seal 80 is fastened to the secondary flange 82 so that the brush 81 bears on the flange 40 of the different crown sectors 30.

Thus, the bristles of the brush 81 allow filling the gaps between adjacent crown sectors 30 and thus allow for an improved sealing.

Such sealing means are compatible with the implementation of a cooling circuit.

In this respect, air passages (not represented) may be formed in the ring 41, for example in the downstream flange 46, in order to control the flow of cooling air passing through the ring 41.

Of course, the invention is not limited to the above-described embodiments. For example, in a non-represented embodiment, the radial degree of freedom between the ring 41 and the guide vane assembly 17 may be obtained by cooperation between one or more pin(s) secured to the guide vane assembly 17 and one or more corresponding opening(s) or groove(s) formed in the ring 41, or in a combination of such a mode of cooperation with that one described with reference to FIGS. 2 to 8.

As regards sealing, the stator assembly may comprise sealing means that are complementary with and/or different from the seal 80 of FIG. 2. For example, a seal (not represented) may be interposed between the flange 40 of the crown sector 30 and a part secured to the ring 41 so as to extend axially upstream of the flange 40.

In the example of FIG. 2, the crown sector 30 represented in this figure comprises grooves 90 formed in the flange 40 and in the platform 31. These grooves 90 are configured to receive a first portion of sealing plates, a second portion of these plates being accommodated in similar grooves 90 formed in an adjacent crown sector 30 so that the sealing plates extend circumferentially between these crown sectors 30 and seal the circumferential space that they define therebetween. Such sealing plates may be arranged according to this principle so as to extend circumferentially between each pair of adjacent crown sectors and thus improve sealing of the assembly.

The invention claimed is:

1. A turbine stator assembly extending around an axis and comprising:
    a sealing ring extending around the axis and comprising an abradable element intended to cooperate with sealing wipers carried by a rotor rotatably mounted around the axis,
    a plurality of crown sectors disposed circumferentially end-to-end around the axis so as to together form a crown, each crown sector being bladed,
    a sliding device enabling a relative movement radially with respect to the axis between the sealing ring and each of the crown sectors such that the plurality of crown sectors and the sealing ring are radially decoupled from each other, the sliding device being disposed at a radially inner end of the crown formed by the plurality of crown sectors, and
    a sealing device located radially outward from the sliding device so as to reduce leaks originating from circumferential spaces located between the circumferentially adjacent crown sectors.

2. The assembly according to claim 1, wherein the sealing device comprise a brush seal bearing axially on the crown sectors, and on the sealing ring or on a part secured to the sealing ring.

3. The assembly according to claim 1, wherein each of the crown sectors comprises, over a circumferential end face, at least one groove, the sealing device comprising sealing plates each of which accommodated both in one of the grooves of one of the crown sectors and another one of the grooves of another circumferentially adjacent crown sector so as to extend through the circumferential space located between the two circumferentially adjacent crown sectors.

4. The assembly according to claim 1, wherein the sliding device comprises pins carried by one amongst the sealing ring and the plurality of crown sectors, the other one amongst the sealing ring and the plurality of crown sectors comprising oblong openings each crossed by a respective one of the pins.

5. The assembly according to claim 1, wherein the sealing ring comprises an upstream flange and a downstream flange and wherein each of the crown sectors comprises a flange extending axially between the upstream flange and the downstream flange of the sealing ring.

6. The assembly according to claim 4, wherein the sealing ring comprises an upstream flange and a downstream flange, wherein each of the crown sectors comprises a flange extending axially between the upstream flange and the downstream flange of the sealing ring, and wherein the flange of each of the crown sectors is connected to the upstream and downstream flanges of the sealing ring via at least one of said pins.

7. The assembly according to claim 6, wherein the flange of each of the crown sectors comprises one or more of said oblong openings.

8. A turbine comprising a casing and a stator assembly according to claim 1 carried by the casing.

9. The turbine according to claim 8, comprising a rotor provided with sealing wipers configured to cooperate with the abradable element of the stator assembly.

10. A turbine engine comprising a turbine according to claim 8.

11. The assembly according to claim 4, wherein each of the pins includes an upstream portion, an intermediate portion, and a downstream portion, a diameter of the intermediate portion being smaller than diameters of the upstream portion and the downstream portion, and the diameter of the upstream portion is smaller than the diameter of the downstream portion, and wherein a width of the oblong openings is greater than the diameter of the intermediate portion and is smaller than the diameters of the upstream portion and the downstream portion.

* * * * *